United States Patent [19]
Mathieu et al.

[11] Patent Number: 6,009,441
[45] Date of Patent: Dec. 28, 1999

[54] SELECTIVE RESPONSE TO A COMMENT LINE IN A COMPUTER FILE

[75] Inventors: Michael C. Mathieu, Seattle; Theodore Stefanik, Redmond; Peter R. Amstein, Seattle; Andrew J. Schulert, Kirkland, all of Wash.

[73] Assignee: Microsoft Corporation, Redmond, Wash.

[21] Appl. No.: 08/697,967

[22] Filed: Sep. 3, 1996

[51] Int. Cl.[6] .................................................. G06F 17/21
[52] U.S. Cl. .......................................... 707/516; 707/513
[58] Field of Search ..................................... 707/513, 516

[56] References Cited

PUBLICATIONS

Baldazo, Rex. "Comparison; Web Building Tools: Battle of the Web Site Builders." BYTE. (Jul. 1, 1996) vol. 21, No. 7, p. 157.
Tittel, Ed and James, Steve. "HTML for Dummies." 2d. (Foster City: IDG Books Worldwide, Inc., Mar. 11, 1996) p. 59.
"User Guide: Adobe SiteMill 1.0." (Jan. 1, 1995): pp. 49–51.
Lemay, Laura and Tyler, Denise. "Laura Lemay's WEB Workshop: Microsoft FrontPage 97" 2d. (Indianapolis: Sams Net, Jan. 1, 1997): pp. 343–355 & 540–542.

Howlett, Dennis. "PC User." (Jun. 26, 1996) No. 286, p. 51.
Rigney, Steve. "PC Magazine." (Apr. 23, 1996) vol. 15, No. 8, p. 117.
Bethoney, Herb. "PC Week." (Dec. 4, 1995) vol. 12, No. 48, p. 96.

*Primary Examiner*—James P. Trammell
*Assistant Examiner*—John Leonard Young
*Attorney, Agent, or Firm*—Ronald M. Anderson

[57] ABSTRACT

A token identifies a special comment that includes information usable by a specific Web page editor. Tile information included within a special comment may include authoring state information, such as parameters used by "WEBBOT" components to provide extensions to hypertext markup language (HTML) features. When a Web page is opened, the editor parses each element on the page and determines if a comment is special by detecting the presence of a predefined token. In the preferred embodiment, the token is the word "WEBBOT." The information included within this special comment can include references to extensions to HTML tags, including those that are not known by the editor, and parameters required by HTML extensions. Since the special comment is in a format ignored by Web browsers, it does not impact upon the ability of a browser to render the page.

28 Claims, 8 Drawing Sheets

THE ITEM BELOW IS THE VISUALIZATION OF THE WEBBOT TABLE OF CONTENTS

SELECTIVE RESPONSE TO A COMMENT LINE IN A COMPUTER FILE

FIELD OF THE INVENTION

The present invention generally relates to the creation, editing, and browsing of documents accessed over a network, and more particularly, to the creation, editing, and browsing of documents including hypertext markup language (HTML) that are accessed by an on-line browser.

BACKGROUND OF THE INVENTION

An on-line information system typically includes at least one computer system (the server) that makes information available so that one or more other computer systems (the clients) can access the information. The server manages access to the information by the client. Communication between the server and client is via messages conforming to a communication protocol and sent over a communication channel such as a computer network, a dial-up connection, or other type of link.

Information sources managed by the server may include files, databases, and applications that are stored on the server system or on a different computer system. The information that the server provides may be converted from other formats manually or automatically, may be computed on the server in response to a client request, may be derived from data and applications on the server or other machines, or may be derived by any combination of these techniques.

On-line services are available on the World Wide Web (WWW), which operates over the global Internet network. The Internet interconnects a large number of otherwise unrelated computers or sites. Client services analogous to those on the WWW can also be made available on private networks called "Intranets" that may not be connected to the Internet, and which typically run over local area networks (LANs) or wide area networks (WANs). The WWW and similar private arehitectures provide a "web" of interconnected document objects. On the WWW, these document objects are located at various sites on the global Internet, but can generally be accessed by a client computer that is connected to the Internet at any point. A more complete description of the WWW is provided in "The World-Wide Web," by T. Berners-Lee, R. Cailliau, A. Luotonen, H. F. Nielsen, and A. Secret, *Communications of the ACM*, 37 (8), pp. 76–82, August 1994, and in "World Wide Web: The Information Universe," by T. Berners-Lee et al., in *Electronic Networking: Researeh, Applications and Policy*, Vol. 1, No. 2, Meckler, Westport, Conn., Spring 1992.

Among the types of objects accessed via an on-line service are documents and scripts. Documents that are published on the WWW are written in HTML. This language is described in *HyperText Markup Language Specification—2.0*, by T. Berners-Lee and D. Connolly, RFC 1866, proposed standard, November 1995, and in "World Wide Web & HTML," by Douglas C. McArthur, in *Dr. Dobbs Journal*, December 1994, pp. 18–20, 22, 24, 26, and 86. Many companies are developing enhancements to HTML that extend the capabilities of the original specification. HTML documents can be created using programs such as Web page editors that are specifically designed for that purpose, or by executing a script file.

The HTML language is used for preparing hypertext documents, which are more formally referred to as Standard Generalized Markup Language (SGML) documents conforming to a particular Document Type Definition (DTD), for access by others over a network. An HTML document includes a hierarchical set of markup elements; most elements have a start tag, followed by content, followed by an end tag. The content is a combination of text and nested markup elements. Tags, which are enclosed in angle brackets ('<' and '>'), indicate how the hypertext document is structured and how to display the document, as well as destinations and labels for hypertext links. There are tags for markup elements such as titles and headers, text attributes such as bold and italic, lists, paragraph boundaries, links to other documents or other parts of the same document, in-line graphic images, and for many other features.

The following lines of HTML briefly illustrate how the language is used:

Some words are <B>bold</B>, others are <I>italic</I>. Here we start a new paragraph.<P>

Here's a link to the <A HREF="http://www.microsoft.com">Microsoft Corporation</A>homepage.

These exemplary lines of HTML would be considered part of a hypertext document because they contain a hypertext "link" to another document (in the line that includes "HREF="). The format of this link is described below. A hypertext document may also have a link to other parts of the same document. Linked documents may generally be located anywhere on the Internet. When a user is viewing the document using a client program called a Web browser (described below), the links are displayed as highlighted words or phrases, or represented as graphic images. When viewed with a Web browser, a Web page containing the sample lines of HTML presented above might be displayed on the user's screen as follows:

Some words are bold, others are italic. Here we start a new paragraph.

Here's a link to the Microsoft Corporation homepage.

In a Web browser, the hypertext link is selected by clicking on the highlighted area with a mouse, causing the hypertext link to be activated. Typically, the screen cursor changes when positioned on a hypertext link. Selecting and activating a hypertext link will cause the associated or referenced document to be displayed. Thus, clicking on the highlighted text "Microsoft Corporation" would fetch and display the associated homepage for that entity.

The HTML language provides a mechanism (the image or "IMG" element) enabling an HTML, document to include an image that is stored as a separate file. When the end user views the HTML document, the included image is displayed as part of the document, at the point where a reference to the image element occurs in the document.

Another kind of document object is a script. A script is an executable program, or a set of commands stored in a file, that can be run by Web server to produce an HTML document that is then returned to the Web browser on the client computer. Typical script actions include running library routines or other applications to fetch information from a file or a database, or initiating a request to obtain information from another machine, or retrieving a document corresponding to a selected hypertext link. A script may be run on the Web server when, for example, the end user selects a particular hypertext link in the Web browser, or submits an HTML form request. Scripts are usually written by a service developer in an interpreted language such as Basic, or in a compiled language such as "C++."

A site at which documents are made available to network users is called a Web site and must run a Web server program to provide clients access to documents referenced on any Web pages at that site. A Web server program is a computer program that allows a computer on the network to make documents available to the rest of the WWW or a private network. The documents are often hypertext documents in the HTML language, and may include images, audio, and/or video information. The information that is managed by the Web server includes hypertext documents that are stored on the server or are dynamically generated by scripts on the Web server.

A user who wishes to access documents available on the network at a Web site must run a Web browser program on the client computer. The Web browser program allows the user to retrieve and display documents from Web servers over the network. Popular Web browser programs include the Internet Explorer™ from Microsoft Corporation.

To retrieve a document, a Web browser may request a document by reference to the uniform resource link (URL) of the document. The Web server then retrieves the document and returns it in a response message to the Web browser. If the returned document has hypertext links, the user may select one of the links to request that a new document be retrieved and displayed. A user may also fill in a form requesting a database search. In response, the Web browser will send a request message to the Web server including the name of the database to be searched, the search parameters, and the URL of the search script.

The HTML is extensible and new features are added with each new generation of Web browsers that is released. Each of these new features are typically referenced by an appropriate HTML tag in a Web page document. A new HTML tag is given a name and its attributes are defined so that a Web browser can provide support for it, i.e., provide some form of visual representation of the new tag and facilitate the functionality it may provide. Thus, new tags can readily be implemented in a new version of a Web browser that is programmed to handle the new tags, but are simply ignored in any version of the Web browser that is not programmed to handle the new HTML tag.

Although a text-based HTML editor that only displays text representing each HTML tag can easily handle new tags, a "what you see is what you get" (WYSIWYG) HTML editor generally cannot. Furthermore, WYSIWYG HTML editors usually lag behind the release of new Web browsers, creating a problem for those who want to create documents that include the new HTML tags that are implemented in the newest browsers. Another aspect of this problem arises because it may be desirable for a specific HTML editor to be able to store parameters, authoring state data, or other data that will not and should not be recognized as valid HTML code by other editors—and more importantly, by Web browsers. Such data may be needed when it is necessary to edit an HTML document that was originally created using that editor. Moreover, the WYSIWYG HTML editor should be able to display something acceptable to the user when encountering lines in the document that would not be considered valid HTML or which were not known in advance to the editor.

One solution to this problem is simply to include new tags or other content that would not be recognized as valid HTML in the file for a document with the expectation that a Web browser will simply ignore or skip over tags that are not recognized. For example, a Web browser provided with the following tags:

```
<HTML>
<BODY>
```

-continued

```
Hello there? <p>
<my__new__tag attribute="foo" other= "bar">
<Goodbye! <p>
<\BODY>
<\HTML>
``` should display:

Hello there!

Goodbye!

and the tag that includes the phrase "my__new__tag" should simply be ignored, if the Web browser has not been programmed to recognize this tag. However, some Web browsers do not properly handle unrecognized HTML. Specifically, differing amounts of vertical white space (lines) can be displayed when the page contains an unknown HTML tag, and something other than a blank line can be generated on the page where the unknown HTML is encountered. Creation of new HTML tags is thus discouraged, since it will be necessary to continually update parse code in a browser (or editor) to handle the new tags. Accordingly, a better solution to this problem is required.

SUMMARY OF THE INVENTION

In accordance with the present invention, a method is defined for storing information in an HTML file, so that the information is recognized by and accessible to a specific Web page editor, but is generally ignored and not directly used by a Web browser or by other types of Web page editors. The method includes the step of incorporating the information in a comment that is stored in the HTML file. A special token is inserted in the comment that includes the information, to indicate that the comment includes the information. When the file is opened by the editor, the editor parses the file and identifies the comment that includes the information, in response to the special token. In this manner, the information in the comment is available to be used by the special editor. A visualization of the information included within the comment statement that comprises the special token is preferably rendered on the page being created or edited.

The editor can use the information included in the comment in several different ways. For example, the information can represent an HTML tag that is not implemented by the Web browser. In addition, the information can be used to: (a) retain authoring data that is not directly usable by the Web browser; (b) to retain authoring data that is not directly usable by the Web browser, but is used by the specific Web page editor; and (c) to produce an HTML tag that is executable by the Web browser. When used to produce the HTML tag that is usable by the Web browser, the specific Web page editor processes the information included in the comment when the file is saved. Alternatively, this editor processes the HTML tag for use by the Web browser when the tag is subsequently accessed by the Web browser, i.e., when an HTML document containing the tag is opened by the browser.

Another feature of the present invention provides for determining a checksum value for an HTML tag. By later comparing the checksum value previously determined to a corresponding current value, it is possible to determine whether the tag has been manually edited after it was created by the Web page editor.

In one preferred form of the invention, the specific Web page editor processes the information included in the comment and saves an output in a related HTML file that includes only tags executable by the Web browser. In another preferred form of the invention, the specific Web page editor selectively saves the output in one of a plurality of alternative formats.

The information stored in the comment can comprise an authoring state of the file, an executable module, or a parameter for the executable module.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

A first embodiment of the present invention was incorporated in a WYSIWYG HTML editor distributed under the trademark FrontPage. Version 1 of the FrontPage™ HTML Web page editor is distributed by Vermeer Technologies, Inc. This editor was further developed and distributed as Version 1.1 by Microsoft Corporation. Most WYSIWYG HTML editors enable users to create Web page content without the need to know the relatively arcane HTML tags that are required to create a desired visual effect. The FrontPage HTML editor employs the present to include information within an HTML document that is recognized and used by the FrontPage HTML editor, but which is generally ignored by a browser that opens that document and by other types of HTML editors. The present invention enables information of almost any type to be included within an HTML document while guaranteeing that the information, which is not recognized as a valid HTML tag for use by a Web browser, does not cause a problem when the Web browser opens and renders the document.

An initial application of the present invention was to insert WebBot components, which are prepackaged application modules intended to run on the Web server, within a Web page. Each of the WebBot components has an appropriate authoring user interface in FrontPage. Fhis interface is typically a property setting dialog box that enables an author to select parameters used by the WebBot component that is being inserted into the document. Further, each of the WebBot components include programming that determines the nature of a visual representation of the WebBot component in the Web page. Generally, each WebBot component is visually rendered as an integral rectangular shaped object. A key advantage of the present invention is that the persistent state for authoring information, such as the parameters used by the WebBot components, can be stored in a Web page document without adversely affecting the capability of a Web browser to open and render the document.

The present invention can be extended to enable an HTML editor to employ almost any arbitrary user interface in the Web document for manipulating the contents of the document, and then can automatically produce a different representation of the document internally intended for use by a Web browser. An even broader application of the present invention would be to enable information to be included in any source language program that can be selectively accessed when the source program file is opened in one environment, but to be ignored when the source file is opened by a different program in a different environment.

By convention, almost all high level languages provide for inclusion of comments within source code. The comments are used for inserting an explanation of the various steps implemented by lines of the source code, and thus, to provide an explanation of the logic embodied in the code to facilitate debugging and changes. Various conventions are applied for marking a comment that is not to be compiled or interpreted. When an interpreter or compiler parses the source code, comments are thus generally ignored.

In HTML, a comment tag begins with <:-- and ends with -->. Furthermore, as is the case in most other language source code, the accepted convention is that anything within an HTML comment tag is simply ignored by a Web browser. Thus, a Web browser should not even display any additional white space in a document corresponding to the location of the comment tag. The present invention makes use of this well-defined behavior for handling HTML comment tags. In this invention, special comment tags include a structured "pseudo-tag" that resides inside the comment tag. The FrontPage HTML editor is programmed to recognize a pseudo-tag in order to detect these special types of comment tags so that the information contained within the special comment tag can be used by the editor in one of several different ways.

Figure 1:
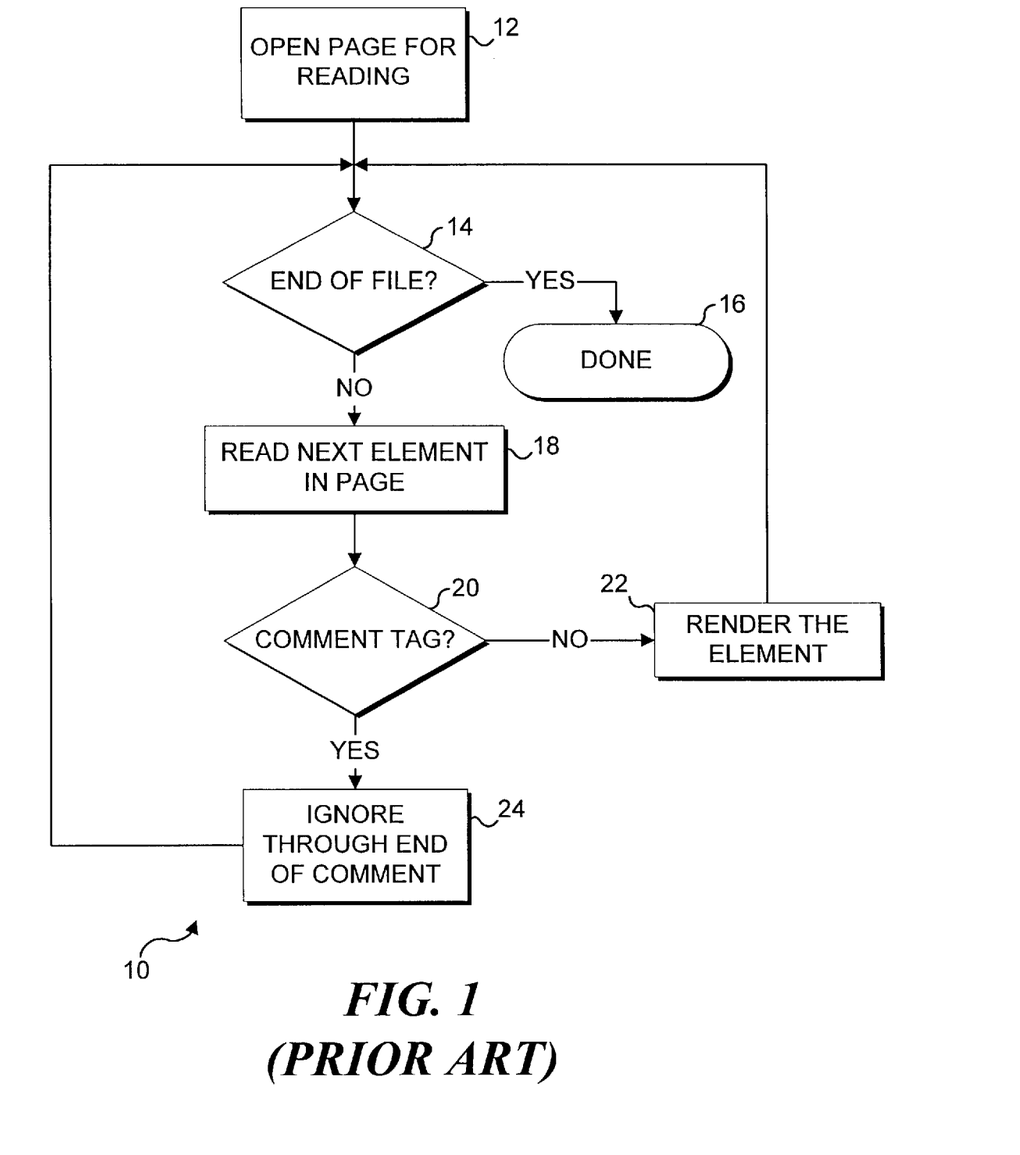
FIG. 1 (prior art) is a flow chart showing how comments are typically processed in HTML documents.

FIG. 1 (prior art) is a flow chart 10 that illustrates the logical steps followed by a conventional HTML Web browser when handling comment tags while opening an HTML document. In a block 12, the Web browser opens a Web page for reading, thus making the contents of the page available to the browser. Next, in a decision block 14, the logic determines if the end of the file in which the Web page is stored has been reached. If so, processing of the Web page terminates in a block 16. However, if the end of the file has not been reached, a block 18 provides for reading the next tag in the page. Each HTML tag encountered is checked to determine if it is a comment tag in a block 20, and if not, a block 22 provides for rendering the tag. When a non-comment tag is rendered, the nature of the HTML tag determines how the Web browser will handle the tag. Several examples of non-comment HTML tags are discussed above, in the Background of the Invention. After an HTML tag is rendered, the program returns to decision block 14. However, if a comment tag is detected in decision block 20, as noted in a block 24, the Web browser ignores all of the content of the comment tag, through the end of the comment. Thereafter, the logic returns to decision block 14.

It should be apparent from flow chart 10 that comment tags are ignored by a browser, since by convention, they do not include any HTML tags that need to be rendered. The handling of comment tags is modified in the FrontPage HTML editor by programming the editor to recognize a "special" comment tag in which a predetermined token is included that identifies the comment tag as a pseudo-tag, which includes information that should be processed and made available for use by the editor.

Figure 7:
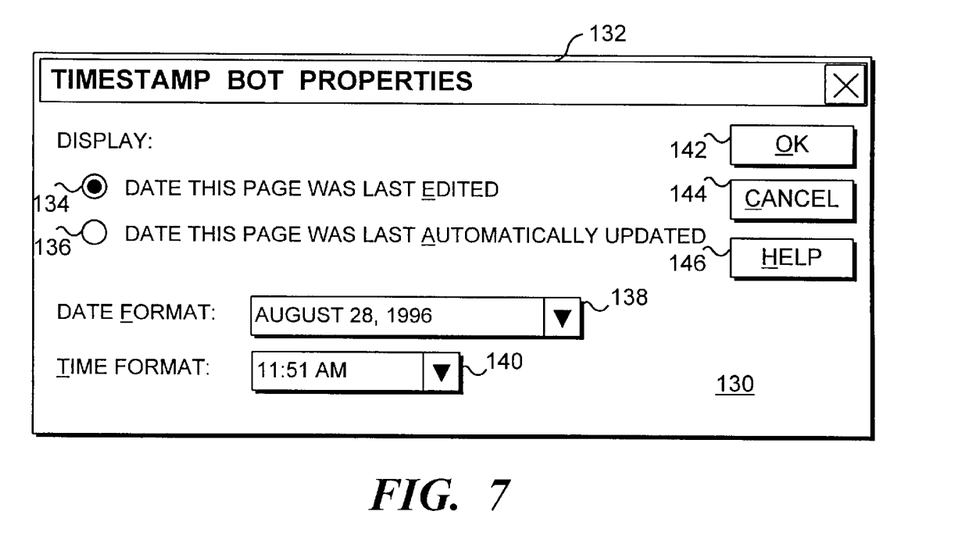
FIG. 7 is a WebBot TimeStamp Properties dialog box that is displayed when a user inserts the WebBot TimeStamp component into a SmartHTML page.

An example should help to clarify how the present invention identifies a special comment tag. One of the WebBot components available for use with the FrontPage HTML editor produces a time stamp on the Web page (using valid HTML) that is visible in a Web browser when the browser opens the Web page. If the user inserts this WebBot component into a Web page using the FrontPage editor, a TimeStamp WebBot properties dialog box 130 opens, as shown in FIG. 7. This dialog box is identified by a title bar 132 and includes several properties that are used by the WebBot TimeStamp component inserted into the Web page. In the example of the properties box shown in this Figure, a radio button 134 is checked to indicate that the user wants the TimeStamp WebBot component to display the date that the current Web page was last edited, when the page is next opened in a Web browser. Alternatively, a radio button 136 could have been checked to indicate that the WebBot component should display the date the Web page was last automatically updated. A drop-down list box 138 is included in the properties dialog, so that the user can select a date format from among those that are listed when the control is activated. Similarly, a drop-down list box 140 displays the current time in several different time formats from which the user can make a selection. Once these parameters have been set, the user can accept and enter the parameters by selecting an OK button 142, or discard the properties chosen by selecting a CANCEL button 144. If necessary, help can be obtained by selecting a HELP button 146.

Figure 8:
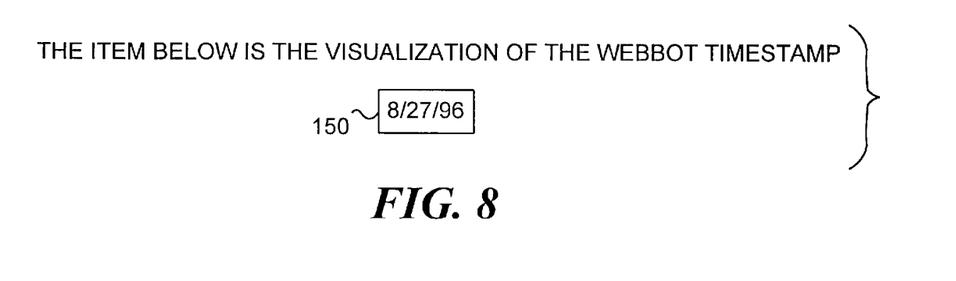
FIG. 8 is a visualization of the WebBot TimeStamp as rendered in a SmartHTML page.

Once the user has entered the parameters as described above, a rectangular representation of the TimeStamp is placed on the Web page being created or edited in the FrontPage editor. An exemplary visualization of the WebBot TimeStamp in the editor is illustrated in a rectangle 150, in FIG. 8. In rectangle 150, only the current date is illustrated. It should be noted that the specific visual representation of the WebBot TimeStamp rendered in the Web page within the Frontllage HTML editor is determined by the code associated with the WebBot TimeStamp component. The visualization of the TimeStamp in rectangle 150 is treated as an integral object to which formatting or editilig operations can be applied. However, the actual HTML representation of the information that identifies the WebBot TimeStamp component and the parameters used by it appear as follows:

```
<!--WEBBOT
BOT=TimeStamp
S-Type="EDITED"
S-Format="%B %d, %Y %I:%M %p"
-->
```

In the preceding HTML, the special comment is identified by inclusion of the predetermined token "WEBBOT," which appears in the first line of the comment. This token, identifying the start of a pseudo-tag within the special comment, includes three structured parameters, including "BOT," "S-Type," and "S-Format." Although there are other types, use of the S- in these structured parameters indicates a string type. The TimeStamp WebBot properties selected in dialog box 130 discussed above define the parameters following the "S-Format" line of the information included within the special comment.

The editor in FrontPage is programmed to recognize a special comment like that in the above example, and therefore processes the information included within the special comment, rather than ignoring the information as is done when the comment is processed by a Web browser or other type of Web page editor. Web pages that contain special comments (i.e., comment tags that include the special predefined token) are referred to in connection with the present invention as "SmartHTML pages."

Figure 2A:
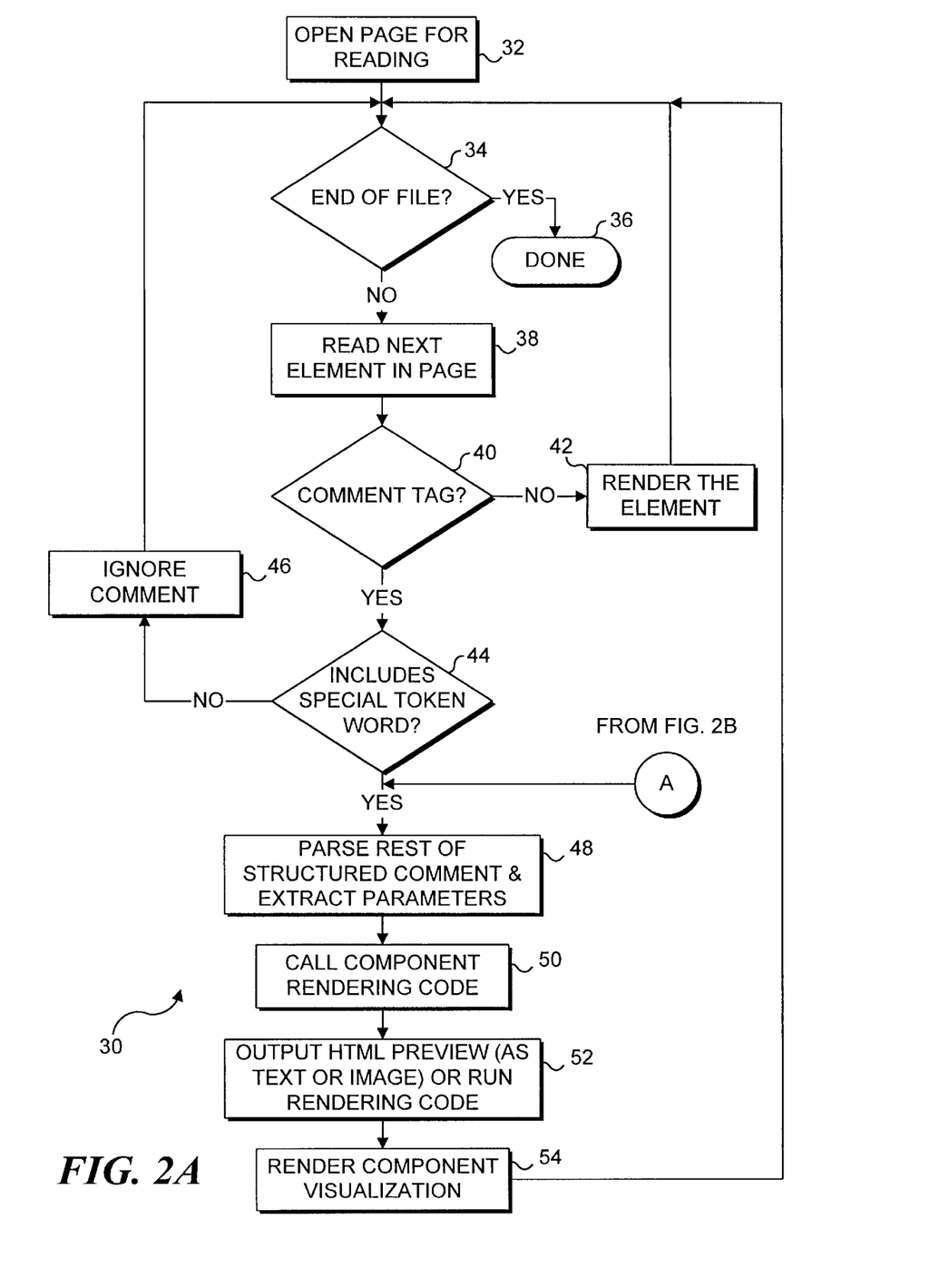
FIGS. 2A and 2B are flow charts illustrating the steps implemented in two different embodiments, by a Web page editor that embodies the present invention, when opening and reading a SmartHTML document file.

Referring now to FIG. 2A, a flow chart 30 illustrates the steps implemented in a first embodiment of the present invention when the FrontPage editor opens a SmartHTML page. She page is opened in a block 32, making the contents of the SmartHTML page available for editing. A decision block 34 determines if the end of the file has been reached, and if so, the process concludes in a block 36. However, if the end of the file has not yet been reached, a block 38 provides for reading the next HTML tag on the page. In a decision block 40, the editor determines if the HTML tag just read is a comment tag and if not, proceeds to render the HTML tag, as indicated in a block 42. In this step, the HTML tag is handled as a function of the type of procedure associated with the tag. The procedure then loops back to decision block 34.

If a comment tag is detected in decision block 40, the editor proceeds to a decision block 44, where the editor determines if the comment tag includes the special predefined token. Although almost any word that is not a conventional word in the English language might be used for this purpose, in the preferred embodiment, the predefined token is "WEBBOT" as noted above. If the comment tag identified does not include the special token, the logic proceeds to a block 46, which provides for ignoring the comment, and then loops back to decision block 34. However, if the editor detects that a pseudo-tag is included based upon its detection of the special token in the comment, it proceeds to a block 48. As noted in this block, the editor parses the remainder of the special or structured comment and extracts any parameters that are included therein. Next, the editor calls any component rendering code referenced in the special comment, as provided in a block 50. The component rendering code can be compiled into the editor, or may comprise external code, such as the code included in one of the WebBot components, or may be code included in a module that is found on the server or on some other computer connected to the system. In a block 52, the editor produces output corresponding to the HTML preview representing the HTML produced or referenced by the information contained in the special comment. The HTML preview causes the editor to render a visualization of the referenced component in a block 54. As noted in the example provided for the WebBot TimeStamp component, the TimeStamp visualization is simply rectangle 150, which contains an exemplary time and/or date. Other component visualizations appropriate to the type of WebBot component referenced by the information in the special comment are alternatively presented on the SmartHTML page open in the editor. After block 54, the logic returns to decision block 34.

It will be apparent that this technique enables the FrontPage editor to handle new types of HTML without being specifically programmed to recognize and process the new HTML extensions. A special comment tag can include the information needed for generating valid HTML code required to implement the new HTML extension on a Web page without the FrontPage editor being required to recognize that new extension. Instead, within the Web page view open in the FrontPage Web page editor, a component visualization represents the new HTML extension and provides the parameters necessary to generate the HTML code that is validly recognized in any browser able to handle the new extension.

Figure 6:
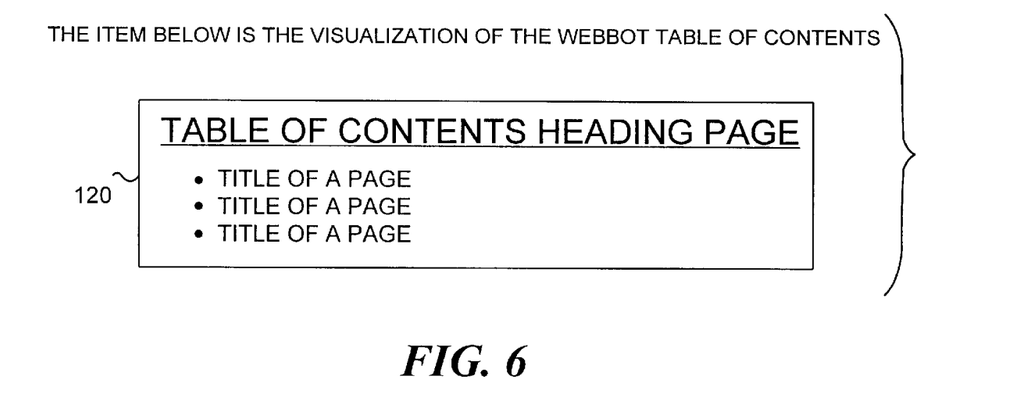
FIG. 6 illustrates a visualization of a WebBot Table of Contents component that is rendered in a SmartHTML page.

Two further examples will help to clarify how code or modules referenced in the information included within a special comment are handled by the FrontPage editor to create a visualization on the Web page that is open for editing, without requiring that the editor actually implement the code in the same mailer that it will be by a Web browser. In FIG. 6, a rectangle 120 includes a visualization for a WebBot Table Of Contents component. This WebBot component can be inserted into a home page, for example, to generate a table of contents that lists the title of each of the other pages referenced by links from the home page. However, the actual listing of the other pages is not implemented within the visual rendering of the Table of Contents object in the home page as it is displayed on the FrontPage editor. Instead, the WebBot Table Of Contents component that has been inserted into the page being edited is visually represented by rectangle 120 and by the generic text shown therein.

Figure 9:
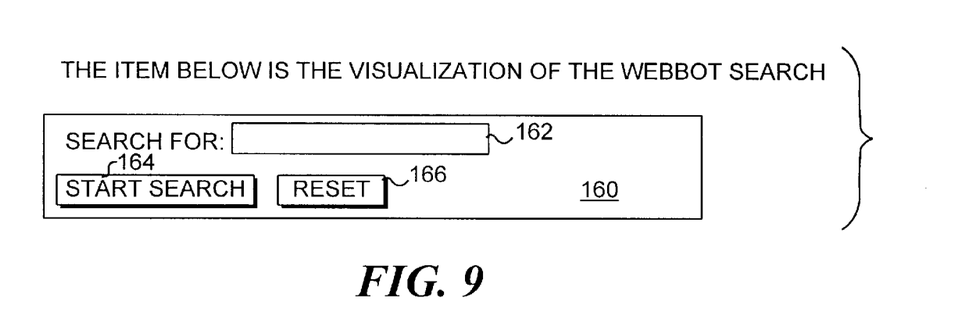
FIG. 9 is a visualization of a WebBot Search component as rendered in a SmartHTML page.

Another WebBot component is used for producing a search form on a Web page opened by a Web browser. As shown in FIG. 9, a rectangle 160 is represented when the WebBot search component is inserted into a page being edited. Rectangle 160, like the other rendered visual representations of the components, is treated as an integral object, so that its component parts, which include a "Search For" text box 162, a Start Search button 164, and a Reset button 166, cannot be separately accessed. However, when a browser opens the Web page in which the WebBot search component has been inserted by the FrontPage editor, the actual search form is presented, so that text can be entered within the text box, and Start Search button 164 and Reset button 166 can be selected.

Figure 2B:
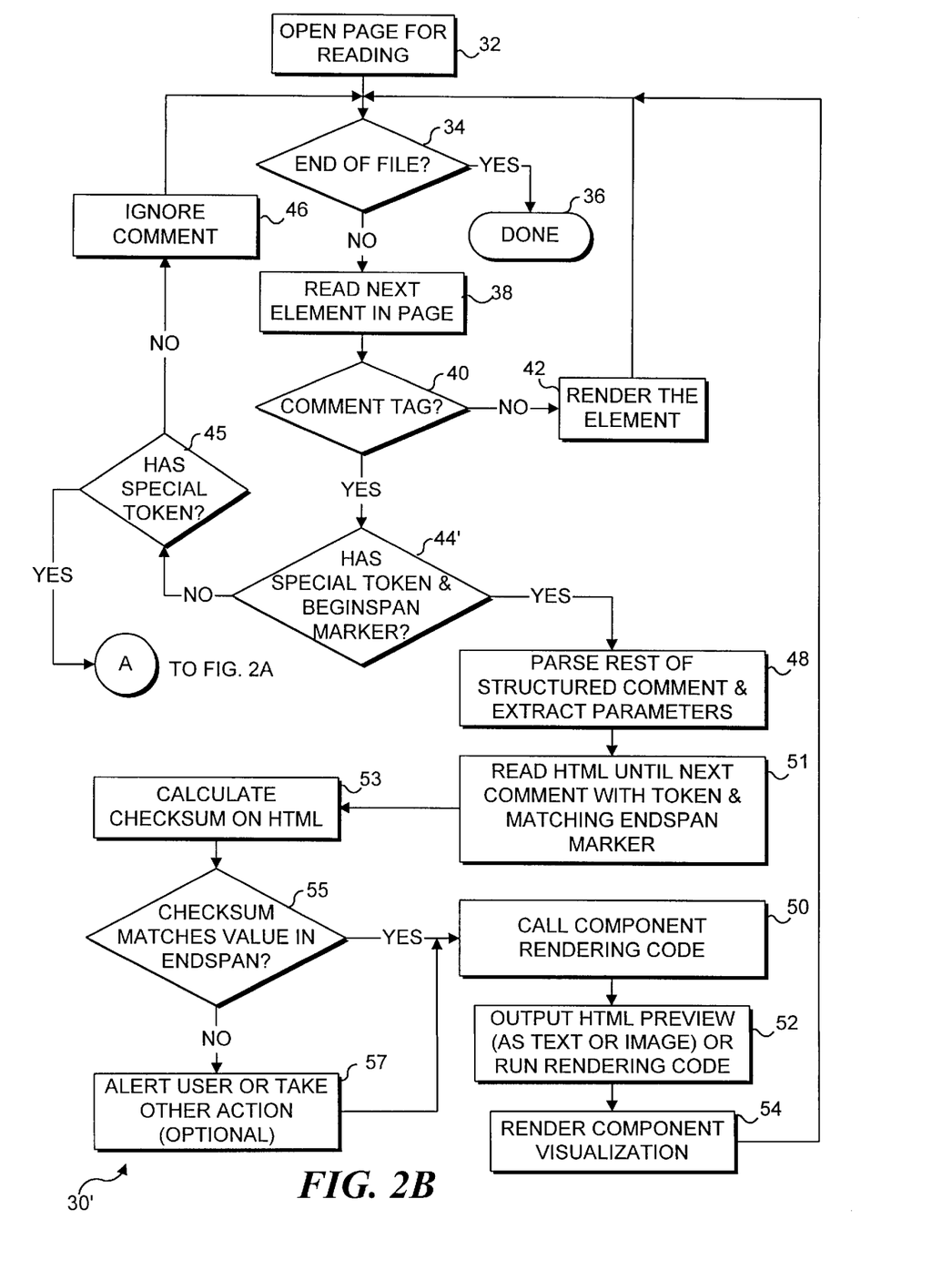

Referring now to FIG. 2B, a second embodiment of the present invention is disclosed in a flow chart 30'. The second embodiment differs from the first embodiment in certain of the steps employed by the FrontPage editor when opening a SmartHTML page. Tile steps in the second embodiment that are identical to those of the first embodiment are indicated by the same reference numbers. Any step in the second embodiment that is similar to but not identical to a step in the first embodiment is indicated by adding a prime to the reference numeral, e.g., 44' versus 44, to distinguish between the two different embodiments. Steps that are entirely new and not included in the first embodiment are indicated in the second embodiment by new reference numerals.

As in the first embodiment, when a page is opened for reading by the editor, successive tags are read to determine if the current tag is a comment tag. If a comment tag is detected in decision block 40, the logic proceeds to a block 44', which determines if the comment tag includes a special token and has a BeginSpan marker ("STARTSPAN"). If not, the comment is ignored, as indicated in block 46 however, if the comment tag includes the special token, e.g., "WEBBOT" and if it includes a BeginSpan marker, the logic proceeds to block 48. In this block, the editor parses the tag until the end of the structured comment and extracts any parameters that are included as part of the information therein. In a block 51, the editor reads a valid HTML that has been inserted within a spanning section. A spanning section begins with the BeginSpan marker and ends with the EndSpan marker. Thus, the special comment tag and the authoring information included therein is wrapped around a valid HTML, and may wrap around a new HTML tag that is not recognized by the FrontPage editor. Tile following example of a special comment tag that spans valid HTML should help to clarify how the spanning syntax is used:

```
<!--WEBBOT
BOT=TimeStamp
S-Type="EDITED"
S-Format="%B %d, %Y %I:%M %p"
STARTSPAN
-->
<b>August 28, 1996 11:51 AM <\b>
<:--WEBBOT ENDSPAN-->
```

In the above example, the STARTSPAN marker is disposed in a special comment and is followed by valid HTML code generated by the WebBot TimeStamp component (in bold font). The span is terminated by the second special comment tag that includes the ENDSPAN marker. It should be noted that STARTSPAN and ENDSPAN markers can be inserted in a hierarehy of matched pairs, so that components can be nested within other components, thereby providing greater flexibility to this syntax.

Next, in a block 53, the editor calculates a checksum on each valid HTML tag that is included between the BeginSpan and EndSpan markers. A decision block 55 determines if the checksum just calculated matches the checksum value that is included within the special comment tag in which the EndSpan marker is found. This check determines whether the HTML was automatically created by the FrontPage editor, which was aware of the extension represented by the HTML tag, or if it has been manually changed. In this maimer, manual edit changes within the syntax can be detected to facilitate automatic resynichronization of different versions of a SmartHTML page.

A negative response to the determination made in decision block 55 leads to a block 57, wherein the editor renders the component visualization as discussed above. Thereafter, or if a positive result was obtained from decision block 55, the logic proceeds to a block 59 in which the HTML spanned by the special comment tag syntax is used as the output HTML, preview for the current component. The nature of the HTML preview is determined by the code associated with the HTML tag, In a block 61, the component is called to facilitate rendering the code associated with the component and/or running any other code referenced thereby. The result is provided in a block 63 wherein the component visualization is rendered in the page open within the FrontPage editor. The logic then returns to decision block 34.

When editing a Web page using the FrontPage editor, components such as the WebBot components noted above can easily be inserted by simply selecting the component from a menu or toolbar. Details of the steps implemented during the insertion process are illustrated in a flow chart 60 in FIG. 3. The procedure begins with a block 62 in which the user chooses a component from a toolbar or menu to insert into a SmartHTML page. A decision block 64 determines if the component has settable options. An example of such a component is the WebBot TimeStamp component discussed above. If so, a block 66 presents the user interface for setting the options or parameters. As previously noted, FIG. 7 illustrates the dialog box presented to enable the user to set the WebBot TimeStamp component properties.

Figure 3:
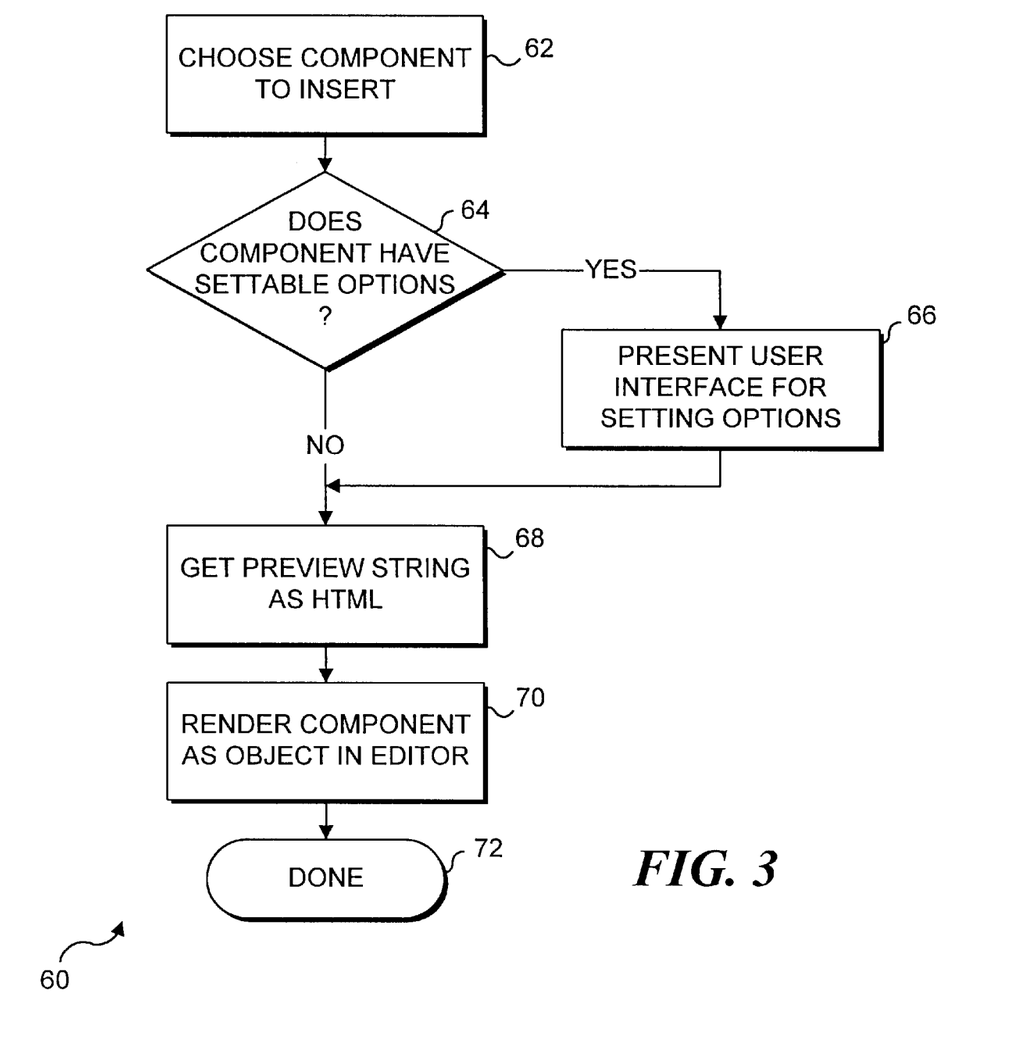
FIG. 3 is a flow chart showing the steps for inserting SmartHTML into a page that is open in the editor.

Continuing with a block 68 in FIG. 3, the editor retrieves a preview string for the component that is being inserted as valid HTML. Alternatively, the editor can run the client side rendering code for the component. As a result, as indicated in a block 70, the component is rendered as an object in the editor. The visual representation of the component in the editor depends upon the nature of the component. Examples were discussed above, in regard to FIGS. 6, 8, and 9.

Figure 4A:
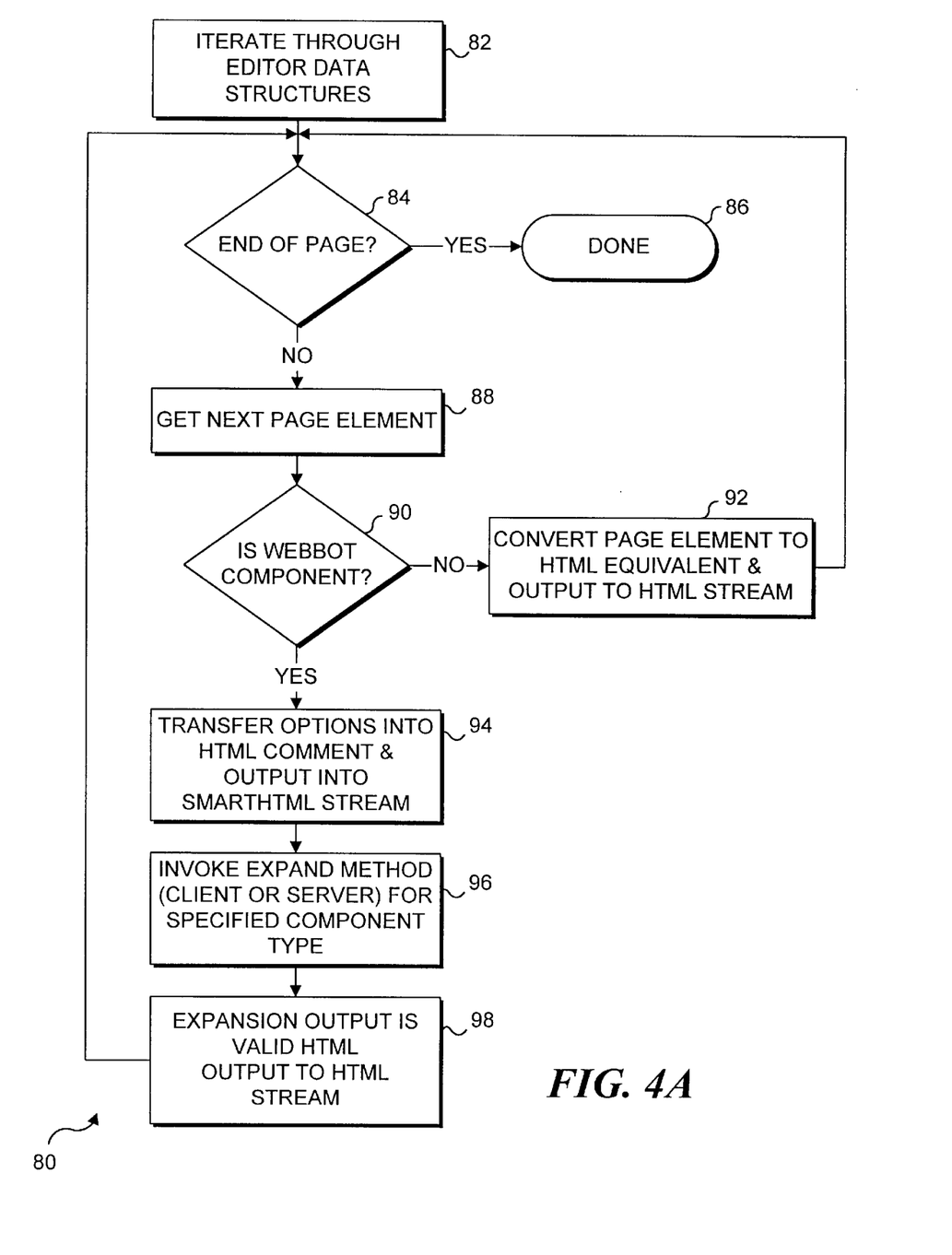
FIGS. 4A and 4B are flow charts respectively illustrating the steps for saving and/or expanding a SmartHTML page in the two different embodiments of FIGS. 2A and 2B.

The two embodiments discussed above in connection with FIGS. 2A and 2B also are respectively represented in the different steps implemented when the editor saves or expands a SmartLHTML page. Referring to FIG. 8A, a flow chart 80 illustrates the steps implemented by the first embodiment when saving or expanding a SmartHTML Web page. In a block 82, the editor iteratively processes the data structures within the SmartHTML page, processing each tag that has been entered on the page in succession. A decision block 84 determines if the end of page has been reached, and if so, the process terminates in a block 86. However, while further tags yet remain on the page to be processed, the next page element is obtained in a block 88. A decision block 90 determines if the next element is a WebBot component. If not, a block 92 provides for converting the current page element to a valid HTML equivalent and outputting that equivalent to the HTML data stream that will be saved in a file for subsequent access by a Web browser.

Conversely, if the current page element is a WebBot component, a block 94 indicates that the options for the WebBot component are transferred into the special HTML comment tag and output into a SmartHTML data stream. The SmartHTML data stream can be stored either in a separate file that is used only by the FrontPage editor, but which is not provided for use by a browser, or can be incorporated within the same file for use by both the editor and the browser. If stored in a separate file, the FrontPage HTML editor will always open this separate file when changes are required in the Web page document. However, there are clearly advantages in storing the SmartHTML data stream that includes the special comment tags discussed above within the same file as all of the other HTML tags that will be accessed by a Web browser.

Next, in a block 96, the FrontPage editor invokes the appropriate expand method for the WebBot component as specified by code associated with the component type that appears on the Web page. In a block 98, the expansion step expands the output from the component, producing valid HTML output. This HTML data stream is either stored in a file that will be opened by the browser, or is included within the same file as the SmartHTML data stream, as noted above. Thereafter, the logic loops back to block 88 to process the next element on the page, and continues looping until all tag elements have been processed on the SmartHTML Web page.

Figure 4B:
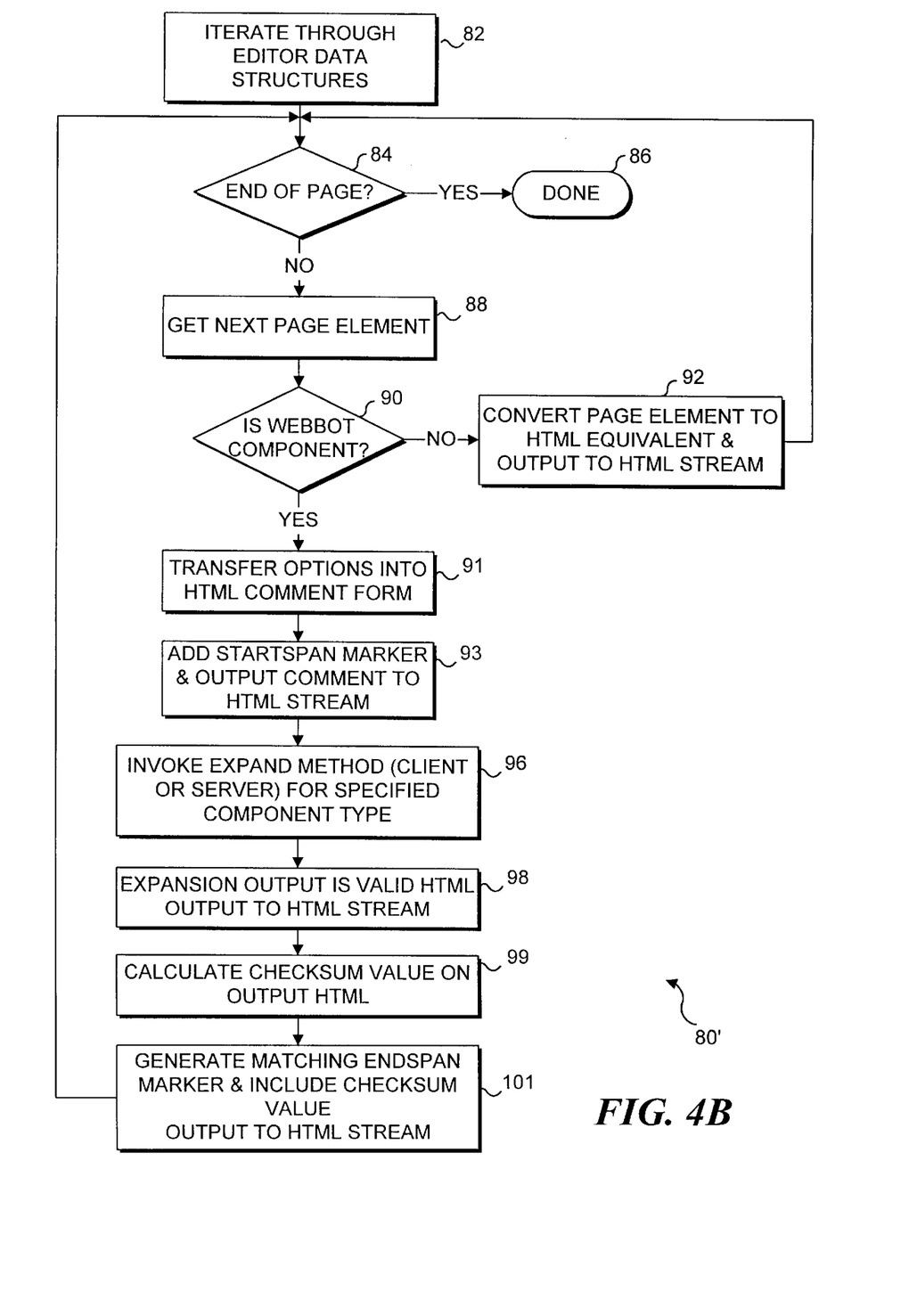

The second embodiment employs a procedure for saving a page that incorporates the SmartHTML syntax used for spanning a valid HTML tag. Some of the steps employed in this process in the second embodiment are thus somewhat different than those in flow chart 80. Details of the method used in the second embodiment are illustrated in a flow chart 80' in FIG. 4B. Again, steps that are identical to those in the method shown in FIG. 4A are referenced by the same numbers. The first difference between the methods occurs in a block 91 after the editor has determined that the current page element is a WebBot component. In this block, as in the first embodiment, the options for the WebBot component are transferred into the SmartHTML comment tag form, but the SmartHTML comment tag is not output into the HTML data stream until the next step, i.e., in a block 93. However, in block 93, before outputting the comment tag, a STARTSPAN marker is added. For example, the SmartHTML special comment tag might read:

```
<!--WEBBOT="TIMESTAMP"
STARTSPAN
S-Type="EDITED"
S-Format="%m %d %y"-->
```

Next, in a block 96, the editor invokes the expand method (to be implemented either by the client or the server as appropriate for the specified type of WebBot component). This step generates the code that will be implemented by the Web browser. A block 98 indicates that the expansion output is valid HTML. Further, the valid HTML output is applied to the HTML data stream in this block. A block 99 provides for calculating a checksum value on the output HTML that was just expanded in the preceding step. Next, in a block 101, the editor generates a matching EndSpan marker and includes the checksum value just calculated. The result is output to the HTML data stream. For example, in connection with the WebBot TimeStamp component, the output to the HTML data stream might include the special comment:

```
<!--WEBBOT
BOT="TIMESTAMP"
checksum="13708"
ENDSPAN-->
```

The HTML data stream usable by the Web browser is stored in the same document as the SmartHTML data in the second embodiment, but in contrast to the first embodiment, the HTML, data stream includes the syntax that encompasses one or more valid HTML tags.

The expansion output in block 98 of FIG. 4A or in block 101 of FIG. 4B can alternatively be applied as an input to a preprocessor module. An example of such a module is a Microsoft Corporation ACCESS™ database Internet assistant. Such Internet assistants can be used for producing valid HTML code based on data from database tables or from spreadsheets, depending upon the type of Internet assistant employed. Thus, the expansion output in blocks 98 or 101 can be formatted as an input code specific to the particular type of preprocessor that will use the code to produce valid HTML tags to access certain types of data in a spreadsheet, database, or in other application programs.

While the present invention has been disclosed in connection with a Web page editor, it is also contemplated that it can be incorporated in other types of computer application programs. Computer programs typically comprise a plurality of machine instructions that are typically stored on a nonvolatile memory media, such as a floppy disk, a CD-ROM for distribution to end users. Computer programs can also be distributed over a network. The machine instructions comprising the computer program that implement the functions of the invention as described above will also likely be distributed in this manner and the invention is intended to encompass the machine instructions that cause a computer to implement the functions described above, regardless of the manner in or media on which the machine instructions are distributed.

Figure 5:
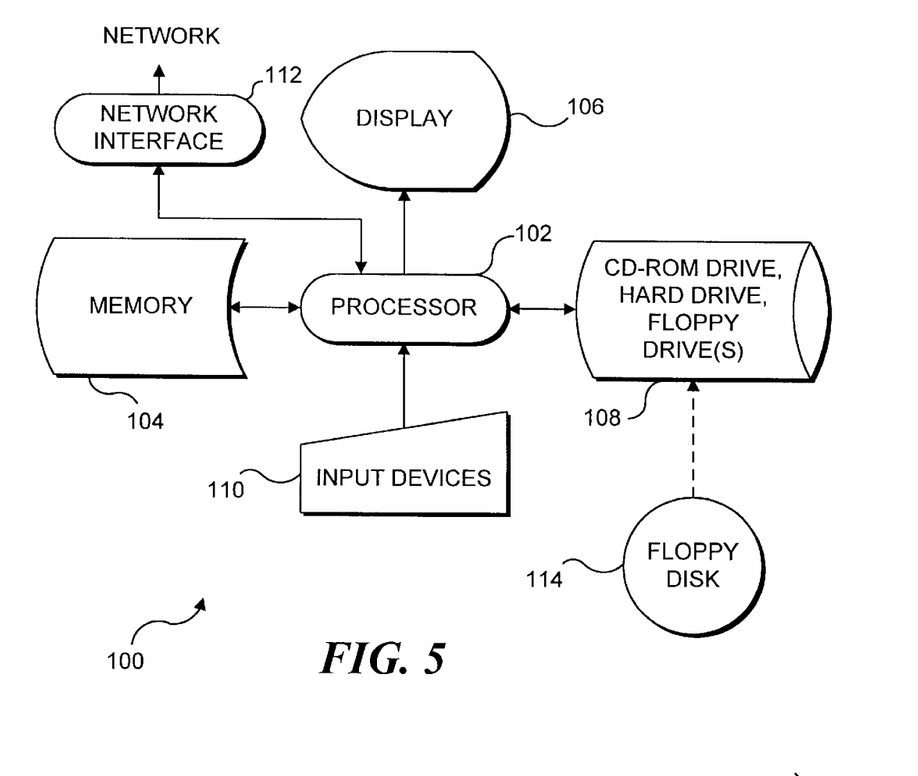
FIG. 5 is a schematic block diagram of a system used for executing a computer program that implements the present invention.

FIG. 5 illustrates a system 100 comprising components of a personal computer suitable for executing a computer program embodying the present invention. In FIG. 5, a processor 102 is coupled bidirectionally to a memory 104 that encompasses read only memory (ROM) and random access memory (RAM). ROM is typically used for storing processor specific machine code necessary to bootup the personal computer comprising system 100, to enable input and output functions, and to carry out other basic aspects of its operation. Prior to running any computer program, the machine language code comprising the program is loaded into RAM within memory 104 and then executed by processor 102. Processor 102 is coupled to a display 106 on which the visualization of the SmartHTML page discussed above is provided to a user. Typically, programs and data are retained in a nonvolatile memory media that are accessed by either a compact disk-read only memory (CD-ROM) drive, a hard drive, or a floppy disk drive, all generally indicated by reference numeral 108 in FIG. 5. A network interface 112 couples the processor to a network.

As noted above, the present invention can be distributed for use on the personal computer comprising system 100 as machine instructions stored on a memory media such as a floppy disk 114 that is read by the floppy disk drive. The program would then typically be stored on the hard drive so that when the user elects to execute the program to carry out the present invention, the machine instructions can readily be loaded into memory 104. Control of the personal computer and selection of options and input of data are implemented using input devices 110, which typically comprise a keyboard and a pointing device such as a mouse (neither separately shown). Further details of system 100 and of the personal computer comprising it are not illustrated, since they are generally well known to those of ordinary skill in the art.

Although the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for storing information in a file, so that said information is selectively recognized and able to be accessed when the file is opened by a specific program, but is generally ignored when the file is opened for use by a different program, comprising the steps of:
   (a) including the information within a comment statement that is saved to the file, said comment statement also comprising a predefined special token;
   (b) parsing the file if it is opened by the specific program, to identify the comment statement that comprises the special token;
   (c) accessing the information included within the comment statement that was identified in step (b), for use by the specific program; and
   (d) rendering a visualization of the information included within the comment statement that comprises the special token.

2. The method of claim 1, wherein the file comprises a plurality of hypertext markup language tags to which said different program responds.

3. The method of claim 1, wherein the specific program comprises a Web page editor.

4. The method of claim 3, wherein the different program comprises a Web browser that is unable to directly use the information included in the comment statement.

5. The method of claim 4, further comprising the step of generating an associated Web browser compatible file, a portion of said Web browser compatible file being generated by the editor using the information included in the comment statement.

6. The method of claim 4, further comprising the step of employing the editor for generating data recognized by the browser, using the information included in said comment statement.

7. The method of claim 4, further comprising the step of employing the Web page editor for generating data for input to an assistant program, using the information included in said comment statement.

8. The method of claim 4, further comprising the step of associating data recognized by the Web browser with the comment statement, said data being generated using the information included within the comment statement.

9. The method of claim 8, wherein the data are generated when the file is saved by the editor.

10. The method of claim 8, wherein an output is produced when the file is opened by the Web browser, using the data generated by the Web page editor.

11. The method of claim 1, wherein the information included in the comment statement comprises at least one of:
   (a) a reference to a component module;
   (b) a parameter;
   (c) a hypertext markup language tag; and
   (d) executable code.

12. The method of claim 1, wherein the specific program employs the information included in the comment statement to selectively generate one of a plurality of alternative outputs.

13. A method for storing information in a hypertext markup language file, so that the information is recognized by and accessible to a specific Web page editor, but is generally ignored and not directly used by a Web browser and by other Web page editors, comprising the steps of:
   (a) including the information in a comment that is stored in the hypertext markup language file;
   (b) inserting a special token in the comment that includes the information; and
   (c) parsing the file when it is opened by the specific Web page editor, said Web page editor identifying the comment that includes the information in response to the special token and using the information.

14. The method of claim 13, wherein the editor uses the information included in the comment to represent a hypertext markup language tag that is not implemented by the Web browser.

15. The method of claim 13, wherein the specific Web page editor uses the information included in the comment to retain authoring data that is not directly usable by the Web browser.

16. The method of claim 13, wherein the specific Web page editor processes the information included in the comment to produce a hypertext markup language tag that is executable by the Web browser.

17. The method of claim 16, wherein the specific Web page editor processes the information included in the comment when the file is saved.

18. The method of claim 16, wherein the information included in the comment is processed to produce a hypertext markup language tag for use by the Web browser when said tag is subsequently accessed by the Web browser.

19. The method of claim 16, further comprising the steps of:
  (a) determining a checksum value for the hypertext markup language tag that is produced; and
  (b) including the checksum value within the hypertext markup language tag, as an indication that said tag was produced by the editor.

20. The method of claim 13, wherein the specific Web page editor processes the information included in the comment and saves an output in a related hypertext markup language file that includes only tags executable by the Web browser.

21. The method of claim 13, wherein the specific Web page editor processes the information included in the comment and saves an output in one of a plurality of alternative formats.

22. The method of claim 13, wherein the information comprises an authoring state of the file.

23. The method of claim 13, wherein the information comprises an executable module.

24. The method of claim 23, wherein the information includes a parameter for the executable module.

25. An article of manufacture adapted for distribution of a computer program, to enable the computer program to be executed on a computer, said computer program enabling the storage of information in a file, so that said information is selectively recognized and able to be accessed when the file is opened by a specific program, but is generally ignored when the file is opened for use by a different program that is executed by said computer, comprising:
  (a) a memory media; and
  (b) a plurality of machine instructions comprising the computer program, which are stored on the memory media, said plurality of machine instructions when executed by a computer, causing the computer to:
    (i) include the information within a comment statement that is saved to the file, said comment statement also comprising a special token;
    (ii) parse the file if it is opened by the specific program, to identify the comment statement that comprises the special token;
    (iii) access the information included within the comment statement thus identified in step (ii), for use by the specific program; and
    (iv) rendertiiig a visualization of the information contained in the comment statement when accessed by the specific program, all comment statements within the file being generally ignored by the different file if the file is opened thereby.

26. A system for storing information in a file, so that said information is selectively recognized and able to be accessed when the file is opened by a specific program, but is generally ignored when the file is opened for use by a different program, comprising:
  (a) a memory in which a plurality of machine instructions are stored;
  (b) a display; and
  (c) a processor that is coupled to the memory to access the machine instructions and to the display, said processor executing said machine instructions implementing a plurality of functions, as follows:
    (i) including the information within a comment statement that is saved to the file, said comment statement also comprising a special token;
    (ii) parsing the file if it is opened by the specific program, to identify the comment statement that comprises the special token;
    (iii) accessing the information included within the comment statement thus identified in step (ii), for use by the specific program; and
    (iv) rendering a visualization of the information contained in the comment statement on the display, all comment statements within the file being generally ignored by the different program if the file is opened thereby.

27. An article of manufacture adapted for distribution of a computer program, to enable the computer program to be executed on a computer, said computer program enabling the storage of information in a hypertext markup language file, so that the information is recognized by and accessible to a specific Web page editor, but is generally ignored and not directly used by a Web browser and by other Web page editors, comprising:
  (a) a memory media; and
  (b) a plurality of machine instructions comprising the computer program, which are stored on the memory media, said plurality of machine instructions when executed by a computer, causing the computer to:
    (i) include the information in a comment that is stored in the hypertext markup language file;
    (ii) insert a special token in the comment that includes the information; and
    (iii) parse the file when it is opened by the specific Web page editor, said specific Web page editor identifying the comment that includes the information in response to the special token and using said information.

28. A system for the storage of information in a hypertext markup language file, so that the information is recognized by and accessible to a specific Web page editor, but is generally ignored and not directly used by a Web browser and by other Web page editors, comprising:
  (a) a memory in which a plurality of machine instructions are stored;
  (b) a display; and
  (c) a processor that is coupled to the memory to access the machine instructions and to the display, said processor executing said machine instructions implementing a plurality of functions, including:
    (i) incorporating the information in a comment that is stored in the hypertext markup language file;
    (ii) inserting a special token in the comment that includes the information; and
    (iii) parsing the file when it is opened by the specific Web page editor, said Web page editor identifying the comment that includes the information in response to the special token and using said information.

* * * * *

UNITED STATES PATENT AND TRADEMARK OFFICE
CERTIFICATE OF CORRECTION

Page 1 of 2

PATENT NO. : 6,009,441
DATED : December 28, 1999
INVENTOR(S) : Mathieu et al.

It is certified that error appears in the above-identified patent and that said Letters Patent is hereby corrected as shown below:

| Column | Line | |
|---|---|---|
| Section [57], Abstract | 2 | "Tile" should read --The-- |
| 1 | 48 | "Researeh" should read --Research-- |
| 3 | 22 | "seareh" should read --search-- |
| 4 | 2 | "Hello there?\<p>" should read --Hello there!\<p>-- |
| 6 | 1 | "Fhis" should read --This-- |
| 7 | 29 | "WcbBot" should read --WebBot-- |
| 7 | 49 | "Frontllage" should read --FrontPage-- |
| 9 | 16 | "mailer" should read --manner-- |
| 9 | 47 | "Tile" should read --The-- |
| 9 | 64 | "46 however," should read --46. However,-- |
| 10 | 9 | "Tile" should read --The-- |
| 10 | 27 | "hierarehy" should read --hierarchy-- |
| 10 | 40 | "maimer" should read --manner-- |
| 10 | 41 | "resynichronization" should read --resynchronization-- |

UNITED STATES PATENT AND TRADEMARK OFFICE
CERTIFICATE OF CORRECTION

PATENT NO. : 6,009,441
DATED : December 28, 1999
INVENTOR(S) : Mathieu et al.

It is certified that error appears in the above-identified patent and that said Letters Patent is hereby corrected as shown below:

| Column | Line | |
|---|---|---|
| 11 | 9 | "Tile" should read --The-- |
| 11 | 15 | "SmartLHTML" should read --SmartHTML-- |
| 15 (Claim 25, Line 23) | 46 | "rendertiiig" should read --rendering-- |

Signed and Sealed this

Tenth Day of April, 2001

Attest:

NICHOLAS P. GODICI

Attesting Officer    Acting Director of the United States Patent and Trademark Office